United States Patent [19]

Wright

[11] Patent Number: 5,082,710

[45] Date of Patent: Jan. 21, 1992

[54] COATED ARTICLE FOR HOT ISOSTATIC PRESSING

[75] Inventor: Joseph M. Wright, Santa Ana, Calif.

[73] Assignee: Loral Aerospace Corp., New York, N.Y.

[21] Appl. No.: 448,797

[22] Filed: Dec. 11, 1989

Related U.S. Application Data

[62] Division of Ser. No. 274,527, Nov. 21, 1988, Pat. No. 4,987,105.

[51] Int. Cl.⁵ .............................................. B32B 33/00
[52] U.S. Cl. .......................................... 428/76; 428/68; 428/220; 428/332; 428/408; 428/698; 428/704
[58] Field of Search .............. 428/704, 698, 408, 220, 428/336, 367, 332, 404, 403, 68, 76

[56] References Cited

U.S. PATENT DOCUMENTS

| | | | |
|---|---|---|---|
| 4,094,799 | 6/1978 | De Vries et al. | 252/29 |
| 4,254,184 | 3/1981 | Tsukagoshi et al. | 428/704 |
| 4,264,546 | 4/1981 | Becker | 264/65 |
| 4,353,953 | 10/1982 | Morelock | 428/408 |
| 4,536,442 | 8/1985 | Bovenkerk et al. | 428/408 |
| 4,568,516 | 2/1986 | Adlerborn et al. | 264/62 |
| 4,612,146 | 9/1986 | Huther | 264/62 |
| 4,642,271 | 2/1987 | Rice | 428/367 |
| 4,717,535 | 1/1988 | Adlenborn et al. | 264/65 |
| 4,944,904 | 7/1990 | Singh et al. | 428/408 |

*Primary Examiner*—Ellis P. Robinson
*Assistant Examiner*—Archene A. Turner
*Attorney, Agent, or Firm*—Edward J. Radlo; Harry G. Weissenberger; Dennis S. Fernandez

[57] ABSTRACT

A coated article comprising an article to be encapsulated within an encapsulant and subjected to hot isostatic pressing, and a coating. The coating is composed of boron nitride and carbon in an amount effective to reduce interaction between the article and the encapsulant during the hot isostatic pressing. The carbon is present up to about 30% by weight of the total boron nitride and carbon in said coating.

7 Claims, No Drawings

COATED ARTICLE FOR HOT ISOSTATIC PRESSING

This is a divisional application of application Ser. No. 274,527, filed Nov. 21, 1988, now U.S. Pat. No. 4,987,105.

FIELD OF THE INVENTION

This invention relates to release coatings for facilitating the release of articles, e.g., ceramic bodies, from encapsulation, e.g. glass encapsulation for hot isostatic press sintering processes, and more particularly to such coatings based on mixtures of boron nitride and carbon.

BACKGROUND OF THE INVENTION

In the manufacture of certain articles, e.g., ceramic parts, higher densities and improved properties may be achieved when a low density preform of the article is densified by a hot isostatic pressing (HIP) sintering process. For some materials, e.g., ceramic materials and ceramic composites, it is necessary to hermetically encapsulate the preform in order to prevent the gas used during HIP processing from infiltrating the preformed body and preventing consolidation. Glass is often applied on or around the preformed body to form the encapsulation. The glass is plastic at sintering temperatures and acts as a pressure transfer medium for the gas to consolidate the material.

Unfortunately, the glass encapsulation can itself cause problems. The glass may interact with, e.g., bond to or react with, the material so as to cause damage to the article. Also, a difference between the expansion coefficients of glass and the material may cause cracking or breaking of thin sections, and surface damage to large bodies, during the cooling portion of the HIP process.

It is consequently necessary to use a release coating between the article, e.g., ceramic part, and the encapsulant which does not react with article surface yet prevents the encapsulant from interacting with the part. The use of such a release coating greatly simplifies the encapsulation technique for complex shaped parts because it allows the use of encapsulants whose thickness approaches that of the part itself, an issue when thin-walled articles are needed.

It has been proposed in U.S. Pat. No. 4,717,535 to use boron nitride (BN) as a release agent. In that patent, the release coating is formed of two or more layers, the inner layer consisting substantially of BN, and the outer layer consisting of a mixture of BN and an additive material which increases the viscosity of the encapsulation glass during processing. This second layer reduces the ability of the glass encapsulation to penetrate through to the part. Pure boron nitride powder coatings are soft with very low strength. Parts coated with it cannot be handled using ordinary processing procedures. Handleability is somewhat improved by the addition of a second layer described in the patent, but the prior art process still leaves a fragile coating on the ceramic preforms. A single layer release coating having good strength and handleability would clearly be advantageous and would eliminate the complexity of applying a two-layer system.

Besides the aforementioned U.S. Pat. No. 4,717,535, the prior art in the field includes: U.S. Pat. No. 4,112,143 which describes a silicon nitride encapsulating technique but does not address the problem of removal and/or reaction of the encapsulant with the ceramic; U.S. Pat. No. 4,264,546 which relates to a psuedo-isostatic hot press process in which boron nitride is used as a pressure transfer medium during the process; U.S. Pat. No. 4,562,817 which applies boron nitride to alumina spacers to prevent reaction between the alumina and the silicon nitride during processing; U.S. Pat. No. 4,568,516 which describes a process for forming a boron nitride layer during processing through a reaction of boron oxide with the nitride of the ceramic material being processed; U.S. Pat. No. 4,612,146 which uses an amorphous carbon coating as the gas-impervious layer for isostatic processing; and U.S. Pat. No. 4,692,288 which discloses a process in which carbon powder is used as the pressure transfer medium. In addition, U.S. Pat. No. 4,094,799 discloses various solid materials, including graphite and boron nitride as additives for lubricating oil compositions. This patent is not concerned with release coatings or methods in forming release coatings, as described herein.

DISCLOSURE OF THE INVENTION

The present invention relates to a release coating that provides a barrier to prevent or minimize interaction, e.g., chemical reaction or mechanical bonding, between the HIP encapsulant, e.g., glass, and the article, e.g., ceramic body, during processing. A durable, single-layer coating is made by forming the coating from a coating composition comprising a mixture of boron nitride and up to about 30% by weight of carbon, preferably graphite and more preferably colloidal graphite. Such a coating composition can be applied to the article by brushing, dipping or spraying. The resulting release coating also provides relief of excessive mechanical stresses induced by thick sections of encapsulant on localized thin segments of the article, simplifying or eliminating the need for complex and costly encapsulants. In a second aspect of the invention, some or all of the carbon in the above-noted composition may be chopped carbon fibers. The addition of the fibers to the release coating provides superior handleability at room temperature and better adhesion to the article throughout the HIP processing. The composition used to coat the article includes a carrier fluid, e.g. liquid, which is volatilized and/or burned out in a pre-HIP process thermal cycle. As an option, polymer binders may be included in this composition and burned out in the pre-HIP process thermal cycle.

The graphite-BN containing composition forms a durable coating at room temperature that remains essentially inert during processing and effectively prevents the encapsulant from interacting with the HIPed body. After pressing, the interacting encapsulant can be removed simply by breaking it, and the release coating can be removed with minimum effort by brushing or light sandblasting. Because the coating reacts little or not at all with the article at processing temperatures, the surface of the HIPed body requires less machining than a body processed without the release coating.

DESCRIPTION OF THE PREFERRED EMBODIMENT

The present invention is based on the recognition that the addition of carbon, e.g., graphite, amorphous carbon and mixtures thereof, preferably graphite, in an amount ranging up to about 30% by weight of the total mixture, to boron nitride produces a superior non-reactive release coating for HIP processing of articles, such as ceramic or ceramic composite parts. The coating composition containing BN and graphite can be brushed, dipped or sprayed on a preform. The final coating, after removal of the carrier fluid and binder preferably has a thickness of about 0.2 to 2 mm. A single layer of the coating is normally sufficient even when a thick layer of encapsulant, e.g., glass, is used. The coating of this invention has considerable strength and becomes sufficiently rigid at relatively low temperatures, due to the binding effect of the carbon, to withstand the mechanical stresses inherent in the HIP process. The coating prevents damage to the part during cooling due to the differences in expansion coefficients between the encapsulant and the part, while preventing or minimizing any physical or chemical interaction between the encapsulant and the part.

In another aspect of the invention, chopped carbon fiber may be substituted for some or all of the carbon to improve the green strength and handleability of the coating.

Many release coating mixtures can be formulated which include variations in component composition, form and source type. The preferred composition ranges in carbon content up to about 30% by weight of the total BN and carbon present. Higher percentages tend toward reduced release capability and an increased possibility for ceramic body surface contamination. The surface contamination is dependent on the composition of the article and HIP process parameters, mainly peak temperature.

The form of BN and the carbon useful in the present coating compositions may vary widely provided that the coating composition functions are described herein. Examples include particles, in particular colloidal particles, fibers, whiskers and the like.

Many of the conventional binder and carrier fluid systems can be used to form the release coating of this invention. Generally these can be adequately decomposed or volatilized in a pre-HIP process thermal cycle. Among the more useful carrier fluids are water, alcohols, ketones, ethers, substantially hydrocarbon materials which have a boiling point below about 200° C. and mixtures thereof. Isopropyl alcohol is a particularly useful fluid carrier material. The fluid carrier material is present in the coating composition in an effective amount, preferably in the range of about 30% to about 90% by weight of the total composition. For maximum handleability, up to 5% organic binder may be included in the coating composition. Commercially available types, such as polyethyloxazoline or poly(alkylene) carbonate based binders, that can be eliminated in an inert atmosphere are preferred. Given a limited preconditioning thermal cycle, a judicious selection of the binder-carrier fluid system is required to eliminate subsequent surface contamination.

The following non-limiting examples illustrate certain aspects of the present invention.

EXAMPLE I

A preform test body composed of silicon oxynitride and boron nitride powders in the general form of a hollow cylinder about 10 cm in length, with an outer diameter of about 2 cm and a wall thickness of about 1 mm was formed. A composition containing 50% by weight of isopropyl alcohol, 42.5% by weight of boron nitride and 7.5% by weight of colloidal graphite was prepared. This composition was brushed onto the test body. The isopropyl alcohol was removed by heating the test body in air to 300° C. for one hour. This produced a coated test body including a coating about 0.5 mm thick made up of a mixture of 85% by weight of boron nitride and 15% by weight of graphite. The coated test body was then encapsulated in glass to a thickness of about 2.0 mm. During the handling of the test body prior to and during the encapsulation, no significant creep or thinning of the coating was observed.

The encapsulated test body was then processed in argon at 100 mPa (metric pressure unit) at 1700° C. for one hour. The body was cooled over a period of 1.6 hours. After cooling, the glass encapsulation easily separated from the test body when broken by striking with a hammer. The coating was then removed by brushing it off with a wire brush. Following this procedure, the test body exhibited a clean, smooth surface and was properly densified. No evidence of any reaction between the coating or the glass and the body was observed.

EXAMPLE II

A test body similar to that in Example I was sprayed with a composition similar to that described in Example I except that it contained 65% isopropyl alcohol and the weight ratio of boron nitride to graphite was 7 to 3. The composition also included 2% weight of a polyethyloxazoline-type binder sold by Dow Corning under the trademark XUS. The coated test body, including a coating about 0.5 mm thick made up of a mixture of 70% by weight of boron nitride and 30% by weight of graphite, was encapsulated and subjected to HIP processing in the same manner as in Example I. The results were similar to those stated in Example I, but it was observed that the coating did not adhere as well to the test body during preprocessing handling.

EXAMPLE III

A test body similar to that in Example I was sprayed with a composition similar to that described in Example I except that it contained 65% by weight of isopropyl alcohol and the weight ratio of boron nitride to graphite was 9 to 1. The coated test body, including a coating about 0.5 mm thick made up of a mixture of 90% by weight of boron nitride and 10% by weight of graphite, was encapsulated and subjected to HIP processing as in Example I. The results were similar to those stated in Example I.

EXAMPLE IV

A test body similar to that in Example I was sprayed with a composition similar to that described in Example I except that it contained 65% by weight of isopropyl alcohol and one-third of the graphite was replaced by shopped carbor fibers. The coated test body, including a coating about 0.5 mm thick made up of a mixture of 85% by weight boron nitride, 10% by weight of graphite and 5% by weight of chopped carbon fibers, was encapsulated and subjected to HIP processing in the same manner as in Example I. The results were similar to those stated in Example I except that the coating was better adhered to the test body after isopropyl alcohol removal than in Example I. It was noted that this composition did not exhibit the flaking of the coating which was sometimes observed during processing.

EXAMPLE V

A test body similar to that in Example I is dipped into a composition comprising 40% by weight of isopropyl alcohol, 2% by weight of the binder described in Example 2, 46.4% by weight of boron nitride and 11.6% by weight of chopped carbon fibers. The dipped test body is processed by heating in air at 300° C. for one hour to remove the isopropyl alcohol and binder, and form a coated test body. The coated test body, including a coating made up of a mixture of 80% by weight of boron nitride and 20% by weight of chopped carbon fibers, is encapsulated and subjected to HIP processing in the same manner as in Example I. Satisfactory results are obtained.

While this invention has been described with respect to various specific embodiments and examples, it is to be understood that the invention is not limited thereto and that it can be variously practiced within the scope of the following claims.

I claim:
1. A coated article comprising:
   an article encapsulated within an encapsulant and subjected to hot isostatic pressing; and
   a coating composed of boron nitride and carbon in an amount effective to reduce interaction between the article and the encapsulant during the hot isostatic pressing, wherein: said carbon is present in an amount up to about 30% by weight of the total boron nitride and carbon in said coating; said boron nitride and said carbon are present in a single layer between the article and the encapsulant; and said layer inertly coats the article, said layer thereby being easily removable from the article.

2. The coated article of claim 1 wherein said boron nitride and carbon are present to provide a barrier in an amount effective to substantially prevent physical and chemical interaction between the article and the encapsulant during the hot isostatic pressing.

3. The coated article of claim 1 wherein at least a portion of said carbon is selected from the group consisting of graphite, amorphous carbon and mixtures thereof.

4. The coated article of claim 1 wherein said carbon is present in the form of fibers.

5. The coated article of claim 1 wherein at least a portion of said carbon is graphite.

6. The coated article of claim 1 wherein the coating has a thickness in the range of about 0.2 mm to about 2 mm.

7. The coated article of claim 1 wherein the coating has a thickness of about 0.5 mm.

* * * * *